United States Patent
Hinz et al.

(10) Patent No.: US 7,888,975 B2
(45) Date of Patent: Feb. 15, 2011

(54) HIGH-SPEED TRANSMIT DRIVER SWITCHING ARRANGEMENT

(75) Inventors: Torsten Hinz, Augsburg (DE); Daniele Gardellini, Villach (DE)

(73) Assignee: Infineon Technologies AG, Neubiberg (DE)

( * ) Notice: Subject to any disclaimer, the term of this patent is extended or adjusted under 35 U.S.C. 154(b) by 77 days.

(21) Appl. No.: 12/108,351

(22) Filed: Apr. 23, 2008

(65) Prior Publication Data
US 2009/0267654 A1 Oct. 29, 2009

(51) Int. Cl.
*H03B 1/00* (2006.01)
*H03K 3/00* (2006.01)

(52) U.S. Cl. .................... 327/108; 327/112
(58) Field of Classification Search .............. 327/108
See application file for complete search history.

(56) References Cited

U.S. PATENT DOCUMENTS

| | | | |
|---|---|---|---|
| 6,522,179 B2 | 2/2003 | Ferianz | |
| 6,774,700 B1 | 8/2004 | Wood | |
| 2006/0181304 A1* | 8/2006 | Dreps et al. | 326/30 |

* cited by examiner

*Primary Examiner*—Lincoln Donovan
*Assistant Examiner*—Daniel Rojas
(74) *Attorney, Agent, or Firm*—Slater & Matsil, L.L.P.

(57) ABSTRACT

The invention relates to a line driver to drive a transmission line with a differentially balanced signal, with selectable signal amplitude, with output impedance matched to a characteristic impedance of the transmission line, and with reduced dissipation. The line driver includes a first driver subcircuit including a first and a second group of resistors. To drive an output node with a first signal sense, the first group of resistors is selectively coupled to a first bias voltage terminal and the second group to a second bias voltage terminal. To drive the first output node with a second signal sense, the first and second groups of resistors are both selectively coupled to the second bias voltage terminal. The line driver includes a second driver subcircuit. The second driver subcircuit includes a third and fourth group of resistors that are correspondingly switched.

37 Claims, 10 Drawing Sheets

HIGH-SPEED TRANSMIT DRIVER SWITCHING ARRANGEMENT

TECHNICAL FIELD

An embodiment of the invention relates generally to line drivers, integrated circuits, and methods, and more particularly to a line driver for transmitting a signal to a receiver over a signal transmission line.

BACKGROUND

When electronic devices are separated by a physical distance that may be greater than a few percent of an electrical wavelength at frequencies of interest, a transmission line is generally used to exchange signals. A transmission line with a characteristic impedance matched to an output impedance of a line driver at its transmitting end and to the impedance of a load at its receiving end is generally employed to avoid signal reflections that can be produced at either end of the line. Signal reflections generate "standing waves" on a transmission line, which can compromise the error rate of signal reception. Although transmission lines are typically viewed as coaxial cables and other similar structures, a patterned path on a printed wiring board or in an integrated circuit can also operate as a transmission line structure.

A signal such as a digital signal is generally transmitted across a transmission line "differentially." In differential signal transmission, the voltage of one conductor of the transmission line is increased, and the voltage of the other conductor is reduced by a corresponding amount. For example, to transmit a signal with a first signal sense, e.g., a binary "1," one conductor of a transmission line might be raised from 1.0 volt to 1.5 volt, and the other conductor reduced from 1.0 volt to 0.5 volt. The opposite voltage changes would be applied to the transmission line conductors to transmit a signal with a second signal sense, e.g., a binary "0." By transmitting a signal with symmetrical voltage changes, the transmission line does not transmit a common-mode voltage component to its receiving end. Accordingly, a virtual ac ground can be created at the receiving end of the transmission line, which, among other issues, avoids the need to match a common-mode impedance at either end of the transmission line. The technique of transmitting signals with symmetric voltage changes allows data to be transmitted at a high rate with minimal interference from noise that may be induced onto a wire pair by external electromagnetic effects. In addition, reference potentials such as ground references at the transmitting and receiving ends of the transmission line can be at different potential levels using such a differential signaling approach. Closely located transmitters and receivers sharing a common ground reference, however, can avoid the need for such differential signal transmission.

To avoid reflections for differential mode signals at either end of a transmission line requires that both a transmitter and receiver terminate the transmission line with an impedance that matches the transmission line (differential-mode) characteristic impedance. The characteristic impedance of a transmission line is related to electromagnetic energy stored per unit length in the line's inductance and capacitance, and is an inherent property of the physical dimensions and materials forming the line. The need to match transmission line impedances generally introduces a power-dissipating element in a line driver at the transmitting end of the line. Such a power-dissipating circuit element detracts from battery life in portable equipment, and contributes to size, cost, and reliability issues in equipment that may be powered from local ac mains.

Thus, there is a need for transmission line driving arrangements and products using arrangements capable of coupling a differential signal to a transmission line with an impedance matched to the characteristic impedance of the transmission line with minimal power dissipation.

SUMMARY OF THE INVENTION

In accordance with an exemplary embodiment, a line driver is provided to drive a transmission line with a differentially balanced signal. In an embodiment, the line driver includes first and second driver subcircuits. The first driver subcircuit includes a first group and a second group of resistors. The first group is coupled to a first terminal of a bias voltage source and the second group is coupled to a second terminal of the bias voltage source to drive a first output node of the first driver subcircuit with a first signal sense. The first and second groups of resistors are both coupled to the second terminal of the bias voltage source to drive the first output node with a second signal sense. The second driver subcircuit includes a third and a fourth group of resistors. The third and fourth groups of resistors are both coupled only to the second terminal of the bias voltage source to drive the second output node with the first signal sense. The third group is coupled to the first terminal of the bias voltage source and the fourth group of resistors is coupled to the second terminal of the bias voltage source to drive a second output node of the second driver subcircuit with the second signal sense.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a line driver to drive a transmission line with a differentially balanced signal, with selectable signal amplitude, and with a line-driver impedance that can be advantageously matched to a characteristic impedance of the transmission line. The invention may also be applied, however, to other line-driving applications, and is not limited to driving transmission lines. Other line drivers can be implemented in different contexts using inventive concepts described herein.

The output signal (i.e., voltage) amplitude of a transmission line driver is generally required to be adjustable to accommodate variations in the physical arrangement of an application circuit. For example, a hard disk in a personal computer, which requires data to be exchanged at a high data rate, can be applied in various physical implementations wherein different connectors, noise environments, separation distances, different levels of signal reflections at transmission line discontinuities, etc., require different signal levels for data to be reliably exchanged between core elements of the computer and a signal receiver in the hard disk or in another physical element of the personal computer. Thus, it is often a design requirement for a high-speed transmission line driver to produce a signal with selectable signal amplitude but at a line-driving impedance that remains matched to the characteristic impedance of the transmission line.

Two implementation approaches are generally used to construct a high-speed transmission line driver. One is a CML—(common-mode logic) based approach, and the other is a voltage-driven, push-pull CMOS—(complementary metal oxide semiconductor) based approach. A CMOS approach has generally been favored due to advantages in power consumption. A CMOS implementation generally dissipates only about one quarter of the power of a CML implementation when driving a transmission line at the full output signal amplitude. However, if the output signal amplitude is reduced, the power consumption of a CMOS implementation generally increases. The power consumption of a CML implementation generally decreases as the output signal amplitude is reduced, approaching no dissipation as the output signal amplitude approaches zero.

Figure 1:
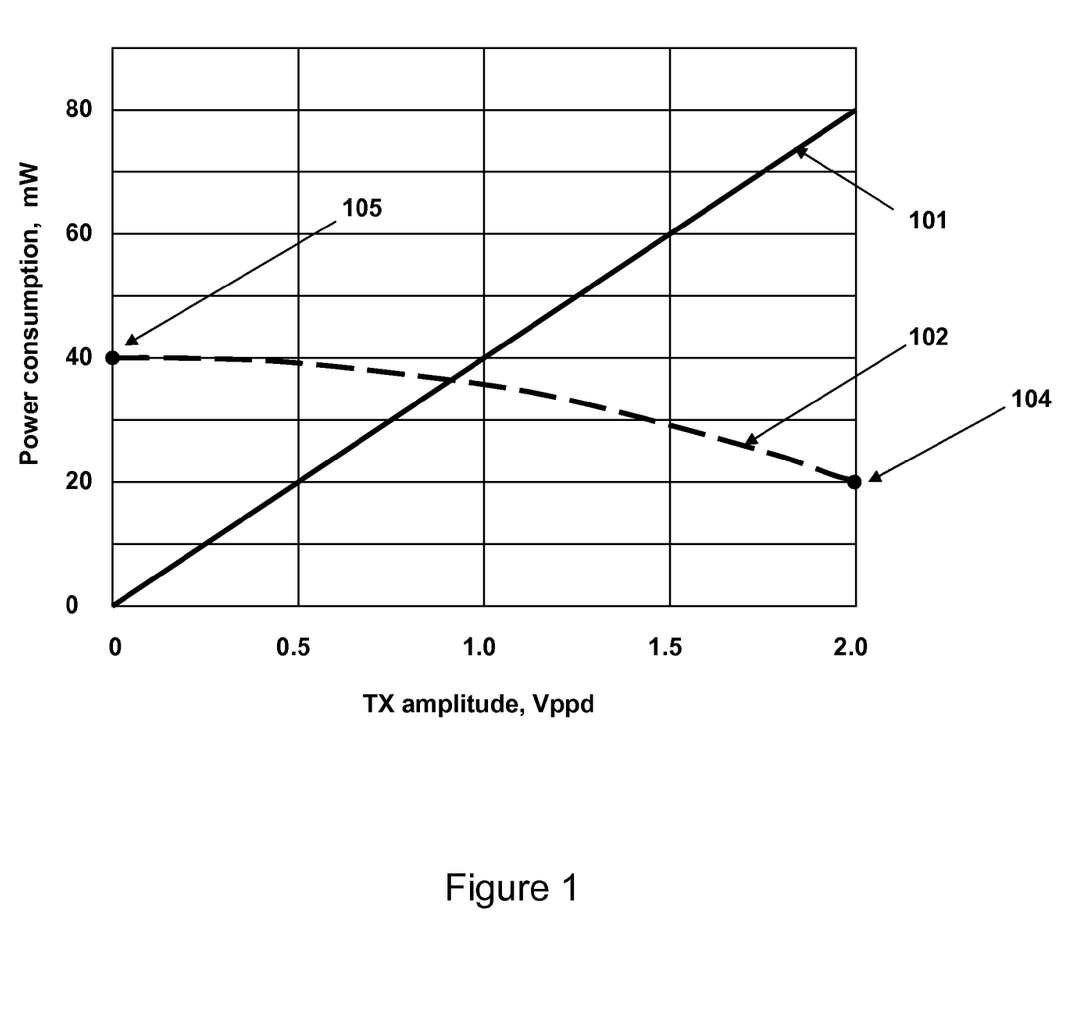
FIG. 1 illustrates a graph of power dissipation for a differential transmission line driver designed with CML and with CMOS, formed employing techniques of the prior art.

Turning now to FIG. 1, illustrated is a graph of power consumption in milliwatts (mW) on the vertical axis for a differential transmission line driver as commonly designed with CML, as represented by curve 101, and with CMOS, as represented by curve 102. The curves were generated for a 2-volt bias voltage source $V_{dd}$, a 50 Ω single-ended output impedance, and an output signal amplitude $V_{ppd}$ adjustable from 0 V to the bias supply voltage $V_{dd}$. The transmitted (TX) output signal amplitude, $V_{ppd}$, is represented on the horizontal axis of the graph. The advantage of a CMOS design at higher output signal amplitudes is evident in FIG. 1. The points 104 and 105 are described later hereinbelow with reference to FIG. 6.

Figure 2:
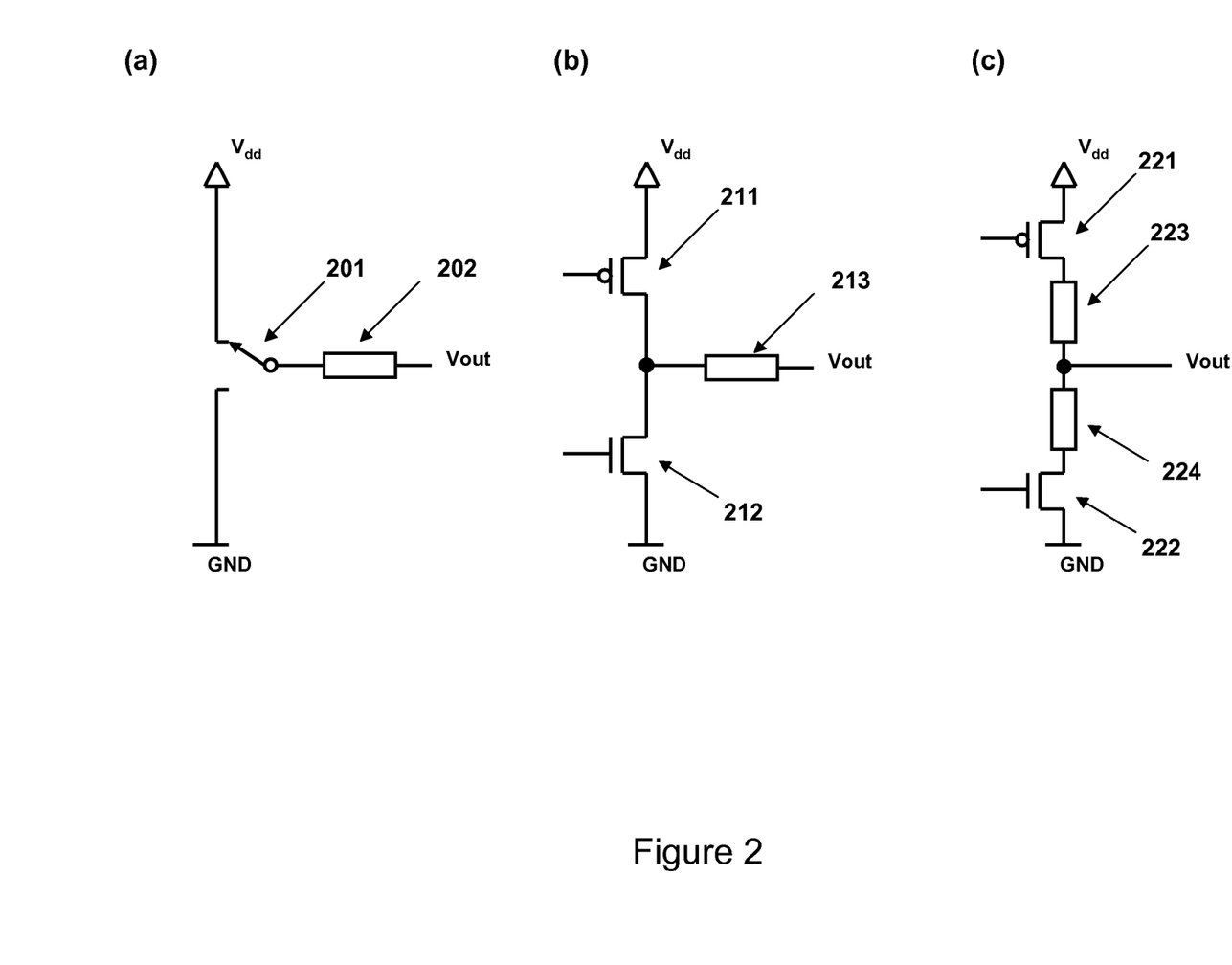
FIG. 2 illustrates a simplified schematic drawing showing the structure of a CMOS implementation of a transmission line driver.

Illustrated in the left portion (a) of FIG. 2 is a simplified schematic drawing showing the structure of a CMOS implementation of a transmission line driver, wherein a resistor 202 is switched by a switch 201 to the bias voltage source $V_{dd}$ or to ground. The resistance of resistor 202 would be selected to match the characteristic impedance of the transmission line, which, without limitation, is taken to be 50 Ω. The output voltage of the transmission line driver is Vout.

A CMOS line driver can be implemented with replicated circuit structures referred to as circuit "slices," each slice including a resistor which is switched to the bias voltage source $V_{dd}$ or to ground. Possible implementations of circuit slices are shown in the central portion (b) and in the right portion (c) of FIG. 2. In the central portion (b), the switching function is shown implemented with p-channel FET (field-effect transistor) 211 and n-channel FET 212. The gates of these FETs would typically be driven with the same signal polarity. The common circuit node between these two FETs is coupled to resistor 213, the resistance of which would be selected to match the characteristic impedance of a transmission line. In the right portion (c) of the figure, the switching function is implemented with a p-channel FET 221 and an n-channel FET 222, and their gates are again typically driven with the same signal polarity. However, resistors 223 and 224 are coupled in series with these FETs, and the common circuit node between these resistors now provides the output signal voltage.

Figure 3:
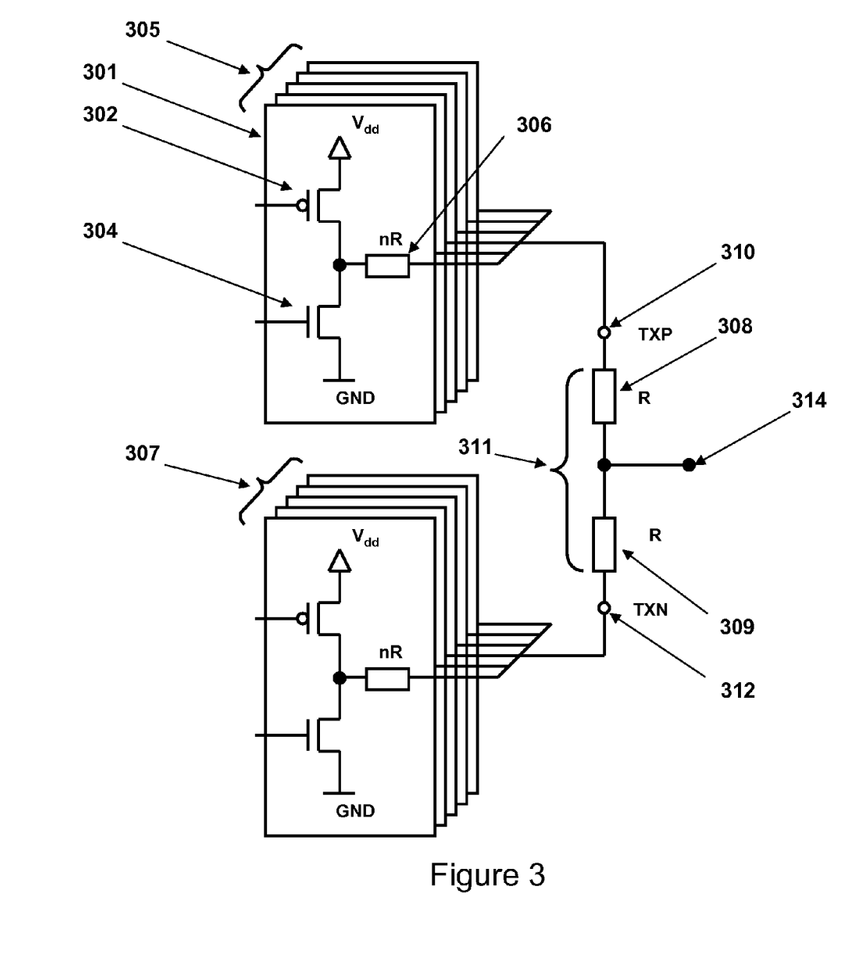
FIG. 3 illustrates a conventional implementation of a transmission line driver containing a plurality of circuit slices.

Turning now to FIG. 3, illustrated is a conventional implementation of a transmission line driver containing a plurality "n" of slices 305, such as slice 301. Each slice includes a resistor, such as resistor 306, with resistance n·R, where R is the termination impedance of the single-ended transmission line to provide impedance matching. Each slice also includes a high-side FET, such as p-channel FET 302, and a low-side FET, such as n-channel FET 304. The common circuit node between these FETs is coupled to resistor 306. As illustrated in the figure, two drivers, a TXP driver and a TXN driver, are implemented to obtain differential line-driver output nodes 310 and 312, respectively the nodes "TXP" and "TXN." The n slices 305 provide the TXP output with the desired output impedance, such as 50 Ω, and the n slices 307 provide the desired TXN output impedance, also such as 50 Ω. The transmission line 311 is represented in the figure by two resistors, 308 and 309, each with a resistance R, such as 50 Ω, coupled together at a common circuit node 314. The common circuit node 314 represents a virtual ac ground at the receiver.

Figure 4:
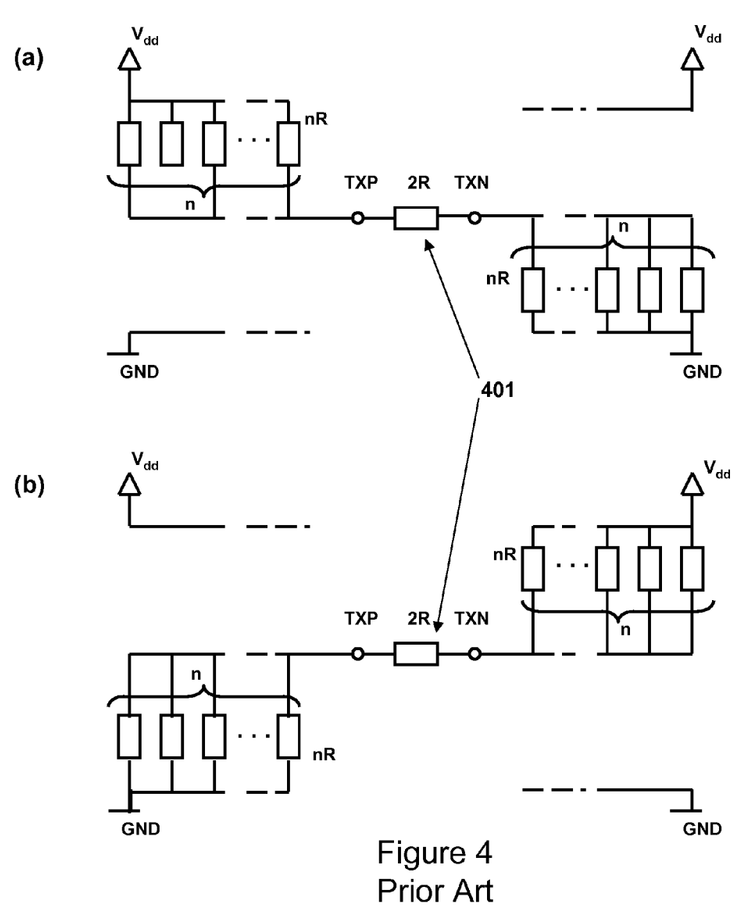
FIGS. 4, 5, and 6 illustrate simplified schematic drawings of couplings of resistors in conventional implementations of a transmission line driver formed with a plurality of circuit slices to drive output nodes.

Turning now to FIG. 4, illustrated is a simplified schematic drawing of couplings of resistors in a conventional implementation of a transmission line driver formed with a plurality n of slices to drive the output nodes TXP and TXN. In the top portion (a) of the figure, the circuit connections of n resistors are illustrated for driving a bit with value "+1" with full output signal amplitude. The switches providing the circuit connections are omitted for simplicity in this and following figures. All resistors of the TXP side are switched to the bias voltage source $V_{dd}$, and all resistors of the TXN side are switched to ground. For driving a bit with value "−1" with full output signal amplitude, all resistors of the TXP side are switched to ground, and all resistors of the TXN side are switched to the bias voltage source $V_{dd}$. In this and in following figures, the transmission line is represented by a resistor 401 of resistance 2R. This resistor can be considered to comprise two resistors in series, each of resistance R, with the common node between them representing a virtual ac ground at the receiving end of the transmission line. In the bottom portion (b) of the figure, the circuit connections of n resistors are illustrated for driving a bit with value "−1" with full output signal amplitude. Thus, a transmission line driver is constructed that matches a characteristic impedance of a transmission line.

Figure 5:
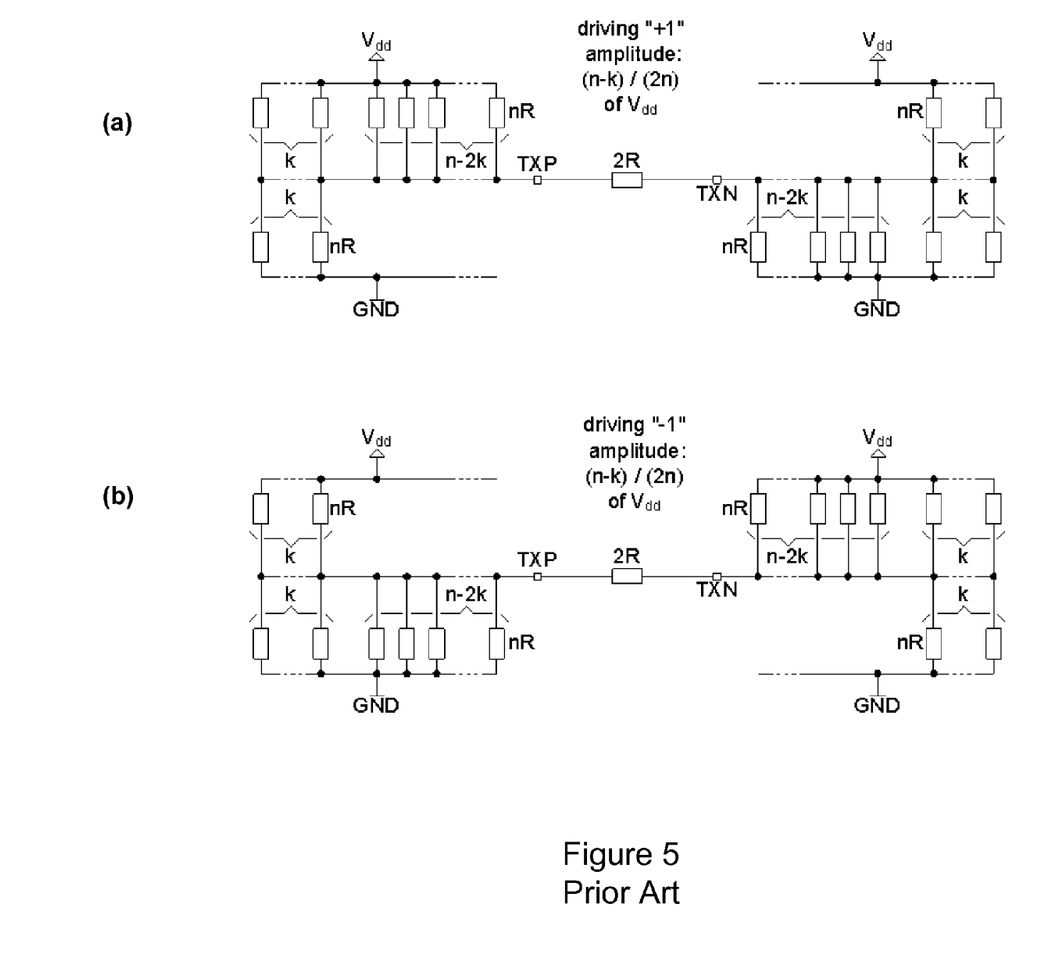

Turning now to FIG. 5, illustrated is a simplified schematic drawing of couplings of resistors in a conventional implementation of a transmission line driver wherein resistors are selectively switched to produce a reduced differential output signal amplitude. For a reduced differential output signal amplitude, only a portion (n−2k) of the n slices are switched to the bias voltage source $V_{dd}$ or, respectively, to ground, and the remaining slices (2k) are switched half to $V_{dd}$ and half to ground. Selectively switching the resistors is necessary to maintain the transmission line-driver impedance of R ohms. Unfortunately, in this conventional arrangement a portion of the slices form a voltage divider between the bias voltage source $V_{dd}$ and ground, creating thereby a dissipative cross current. The cross current flowing through the voltage divider does not contribute to the transmitted signal itself, and therefore produces wasted power. In a transmission line driver formed according to an embodiment, cross currents are reduced, particularly for reduced output signal amplitude, thereby reducing power dissipation of the line driver.

Figure 6:
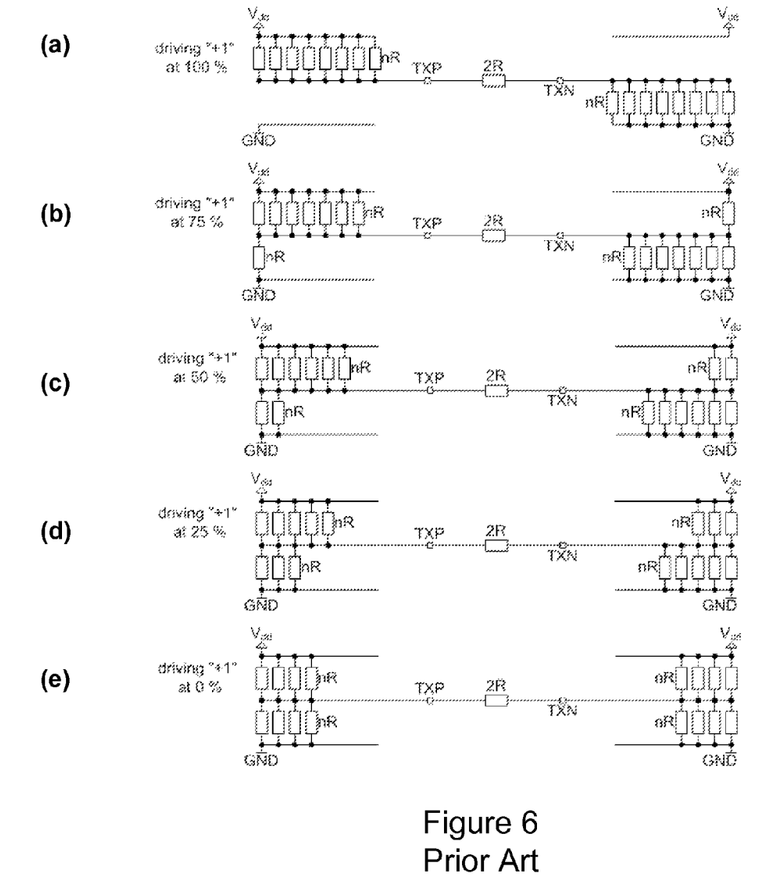

Turning now to FIG. 6, illustrated are further conventional switching arrangements for resistors in the n slices to produce various output signal amplitudes for driving a bit of value +1. FIG. 6 shows for the example of eight resistors a conventional switching arrangement to achieve a transmitted bit value of "+1" at 0%, 25%, 50%, 75% and 100% output signal amplitude.

In the top portion (a) of FIG. 6, illustrating the case of driving +1 at full output signal amplitude, all eight resistors on the left side are coupled to the bias voltage source $V_{dd}$, and all eight resistors on the right side are coupled to ground. No wasted cross current is created. The only dissipative current is the useful current that flows from the bias voltage source $V_{dd}$ through the eight paralleled top resistors (with a parallel resistance of R ohms), through the 2R ohms of the transmission line, and through the eight paralleled bottom resistors (with a paralleled resistance of R ohms), to ground. The total dissipation is $(V_{dd})^2/(4R)$ watts, which corresponds with the point 104 illustrated in FIG. 1.

In the bottom portion (e) of FIG. 6, illustrating the case of driving +1 at zero output signal amplitude, half of the resistors on the left side are coupled to the bias voltage source $V_{dd}$, and half are coupled to ground. On the right side, half the resistors are coupled to the bias voltage source $V_{dd}$, and half are coupled to ground. The result is a wasted cross current on both sides, providing total power dissipation of $(V_{dd})^2/(2R)$, which corresponds with the point 105 illustrated in FIG. 1 for the case R=50 Ω and 2 volts bias between $V_{dd}$ and ground. The number of slices n does not affect the result. The remaining portions (b), (c), and (d) in FIG. 6 illustrate intermediate output signal amplitudes.

Driving a bit with value −1 is obtained by a symmetric inversion of the +1 resistor topology illustrated in FIG. 6. The midpoint node of the transmission line (the midpoint of the 2·R resistor) is preserved at a voltage of $(V_{dd})/2$ for both values of the driving bit.

Figure 7:
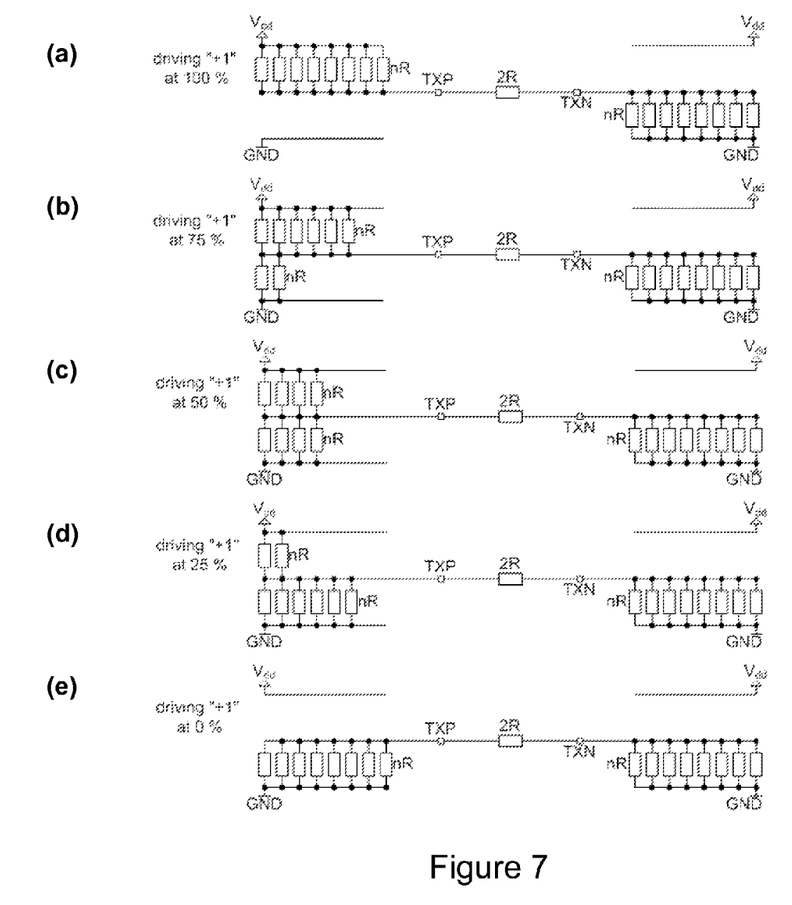
FIGS. 7, 8, and 9 illustrate simplified drawings of couplings of resistors in a line driver constructed according to an embodiment.

Turning now to FIG. 7, illustrated are simplified drawings of couplings of resistors in a line driver constructed according to an embodiment. FIG. 7 illustrates, without limitation, the example of eight resistors switched to achieve a "+1" at 0%, 25%, 50%, 75% and 100% output signal amplitude. The switching procedure of the resistors in the slices is performed to avoid at least a portion of wasted cross currents created by the switching arrangement. The switching of the resistors ensures that for a "+1," all n resistors on the TXN side are switched to ground independently of the selected output signal amplitude. On the TXP side, a number of resistors is switched to the bias voltage source $V_{dd}$. The remaining resistors are switched to ground. The switching arrangement advantageously results in wasted cross currents that are reduced to a minimum, and approach zero as the output signal amplitude approaches zero. The switching arrangement also preserves a virtual ac ground at the midpoint of the 2R resistor representing the receiving end of the transmission line for any percent of output voltage. For a "−1," the TXP and TXN sides are symmetrically interchanged.

Of course, variants of the switching arrangement illustrated in FIG. 7 to achieve a "+1" can also be constructed according to advantageous embodiments. For example and without limitation, all n resistors on the TXN side can be switched to the bias voltage source $V_{dd}$ independently of the selected output signal amplitude. On the TXP side, a number of resistors is switched to ground, and the remaining resistors are switched to the bias voltage source $V_{dd}$.

Figure 8:
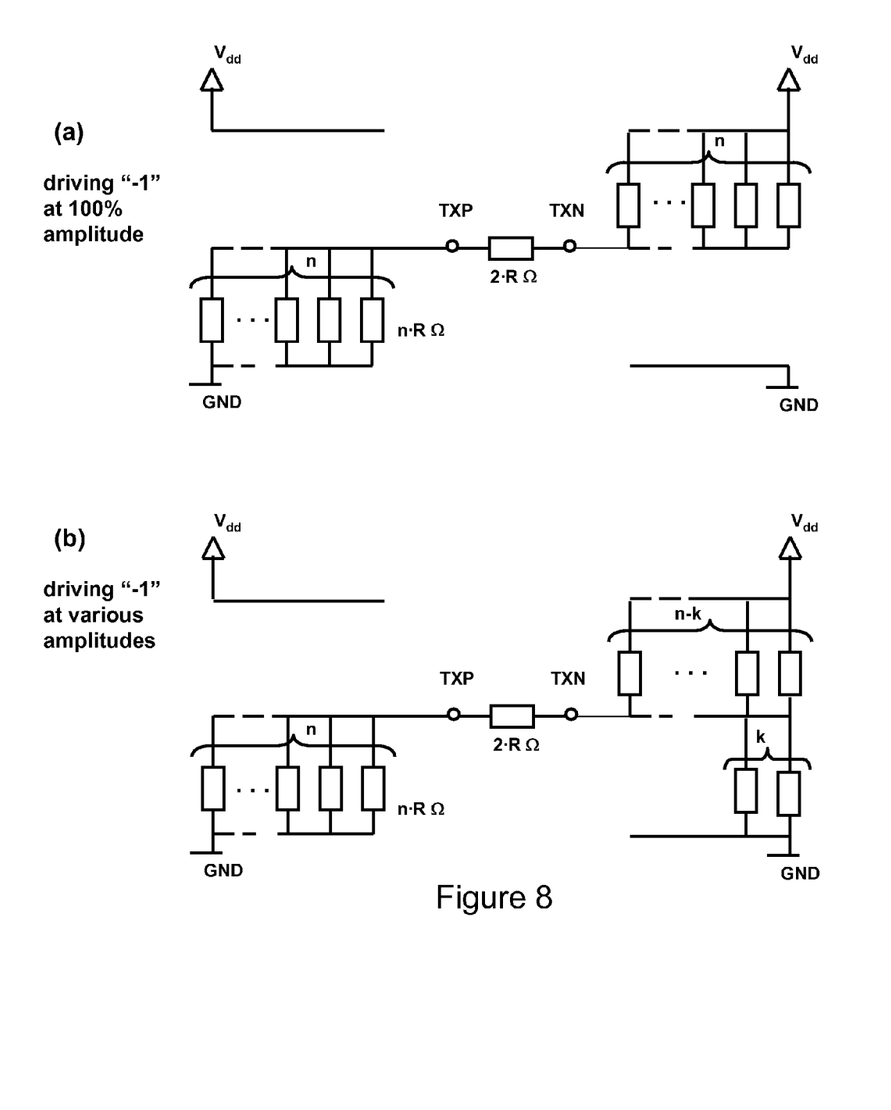

FIG. 8 illustrates simplified schematic drawings of couplings of resistors in a line driver corresponding to the switching arrangement illustrated in FIG. 7, constructed according to an embodiment, illustrating resistors switched to achieve a "−1" at 100% and various other levels of output signal amplitude. Switching the resistors to achieve a "−1" for various levels of output voltage drive strength are constructed by selection of the integer k, where k≦n.

Figure 9:
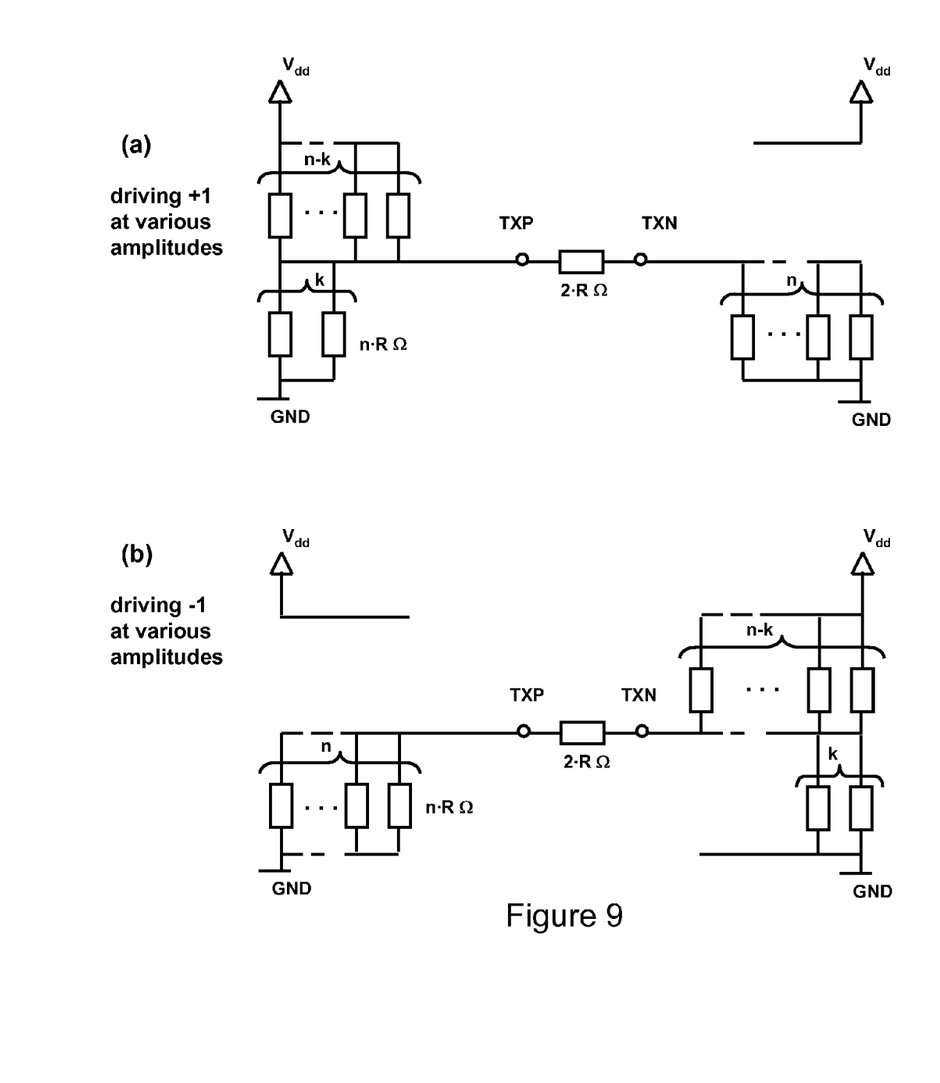

Turning now to FIG. 9, illustrated are simplified schematic drawings of couplings of resistors in a line driver constructed according to an embodiment. The top portion (a) of the figure illustrates the couplings of resistors to drive a bit "+1" at various output signal amplitudes. Output signal amplitudes are selected by the parameter k, described previously hereinabove. In the lower portion (b) of the figure, the couplings of resistors to drive a bit "0" (represented in the figure by the symmetric value "−1") at various output signal amplitudes are shown. Again, output signal amplitudes are selected by the integer k.

Figure 10:
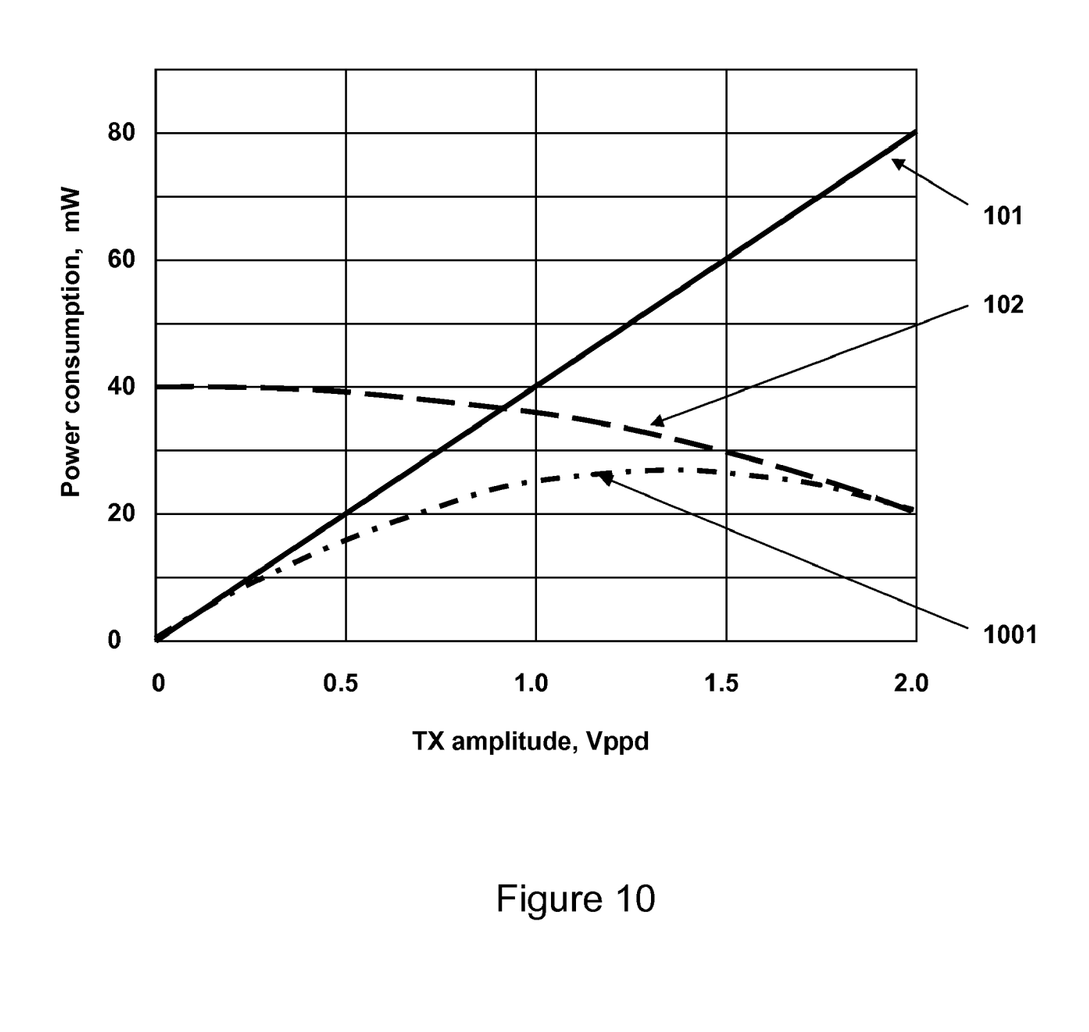
FIG. 10 illustrates power dissipation for different line-driver implementations, including a line-driver implementation constructed according to an exemplary embodiment.

FIG. 10 illustrates power dissipation for the different line driver implementations using a voltage bias source $V_{dd}$=2V, 50 Ω, single-ended impedance, and output signal amplitude $V_{ppd}$ ranging from 0 volts to 2 volts The formulas used for the power calculations illustrated in FIG. 10 are:

for a CML implementation (curve 101):

$$P=1/R \cdot (V_{ppd} \cdot V_{dd}),$$

for a conventional CMOS implementation (curve 102):

$$P=1/R \cdot (0.5 \cdot V_{dd}^2 - 0.25 \cdot V_{ppd}^2),$$ and for a CMOS implementation constructed according to an embodiment (curve 1001):

$$P=1/R \cdot (V_{dd} \cdot V_{ppd} - 0.75 \cdot V_{ppd}^2).$$

The power consumption of a line driver transmitter constructed according to an embodiment versus the programmed drive strength thus provides reduced power dissipation. The high efficiency previously achieved in a CMOS implementation at full output voltage drive strength and the high efficiency achieved with a CML implementation at low output voltage drive strength are now both achieved in the same circuit arrangement.

The concept has thus been introduced of driving a transmission line with an asymmetrical switching arrangement of resistors to provide a line-driver impedance substantially matched to a characteristic impedance of the transmission line. In this manner, power dissipation is advantageously reduced.

In accordance with one exemplary embodiment, a line driver includes a first driver subcircuit. The first driver subcircuit includes a first plurality of switchable resistance elements that are grouped into a first group and a second group of switchable resistance elements. Each element in the first group is coupled to a first bias voltage terminal and each element in the second group is coupled to a second bias voltage terminal to drive an output node of the first driver subcircuit with a first signal sense and a first signal amplitude.

Each element of the first and second groups is coupled to the second bias voltage terminal to drive the output node of the first driver subcircuit with a second signal sense and the first signal amplitude. In an embodiment, each element in the first and second groups is coupled to the first bias voltage terminal to drive the output node of the first driver subcircuit with the first signal sense and a higher signal amplitude, and each element of the first and second groups is coupled to the second bias voltage terminal to drive the output node of the first driver subcircuit with the second signal sense and the higher signal amplitude.

In an embodiment, the line driver is formed with a second driver subcircuit that includes a second plurality of switchable resistance elements. The second plurality of switchable resistance elements is grouped into a third group and a fourth group of switchable resistance elements. Each element in the third and fourth groups is coupled to the second bias voltage terminal to drive the output node of the second driver subcircuit with the first signal sense and the first signal amplitude, and each element in the third group is coupled to the first bias voltage terminal and each element in the fourth group is coupled to the second bias voltage terminal to drive the output node of the second driver subcircuit with the second signal sense and the first signal amplitude. In an embodiment, each element in the third and fourth groups is coupled to the second bias voltage terminal to drive an output node of the second driver subcircuit with the first signal sense and the higher signal amplitude, and each element in the third and fourth groups is coupled to the first bias voltage terminal to drive the output node of the second driver subcircuit with the second signal sense and the higher signal amplitude.

In an embodiment, each switchable resistance element is formed with a resistor with one terminal selectively coupled to the first bias voltage terminal or to the second bias voltage terminal, and another terminal coupled to the output node of the first driver subcircuit. In an embodiment, each switchable resistance element is formed with two resistors coupled together at the output node of the first driver subcircuit. One resistor of the switchable resistance element is selectively coupled to the first bias voltage terminal, and the other resistor is selectively coupled to the second bias voltage terminal. In an embodiment, the switchable resistance elements are selectively coupled to the bias voltage terminals with semiconductor switches such as field-effect transistors.

In an embodiment, the line driver drives the output node of the first driver subcircuit with a line-driver impedance that is substantially matched to a characteristic impedance of a transmission line coupled to the line driver. In an embodiment, the line driver produces a differentially balanced signal at the output nodes.

In an embodiment, the first and second subcircuits are formed with replicated circuits. In an embodiment, one of the replicated circuits is formed with a resistor coupled to a plurality of switches.

In an exemplary embodiment, a line driver includes a first driver subcircuit. The first driver subcircuit is formed with a first plurality of switchable resistance elements. The first plurality of switchable resistance elements is grouped into a first group and a second group of switchable resistance elements. Each element in the first and second groups is coupled to a first bias voltage terminal to drive an output node of the first driver subcircuit with a first signal sense and a full signal amplitude, and each element in the first group is coupled to the first bias voltage terminal and each element in the second group is coupled to a second bias voltage terminal to drive the output node of the first driver subcircuit with the first signal sense and a reduced signal amplitude.

In an embodiment, the line driver includes a second driver subcircuit formed with a second plurality of switchable resistance elements. Each element in the second plurality of switchable resistance elements is coupled to the second bias voltage terminal to drive an output node of the second driver subcircuit with the first signal sense and the full signal amplitude, and each element in the second plurality of switchable resistance elements is coupled to the second bias voltage terminal to drive the output node of the second driver subcircuit with the first signal sense and the reduced signal amplitude.

In an embodiment, each element in the first and second groups is coupled to the second bias voltage terminal to drive the output node of the first driver subcircuit with a second signal sense and the full signal amplitude, and each element in the first and second groups is coupled to the second bias voltage terminal to drive the output node of the first driver subcircuit with the second signal sense and the reduced signal amplitude. The second plurality of switchable resistance elements is grouped into a third group and a fourth group of switchable resistance elements. Each element in the third and fourth groups is coupled to the first bias voltage terminal to drive the output node of the second driver subcircuit with the second signal sense and the full signal amplitude, and each element in the third group is coupled to the first bias voltage terminal and each element in the fourth group is coupled to the second bias voltage terminal to drive the output node of the second driver subcircuit with the second signal sense and the reduced signal amplitude.

In an embodiment, each switchable resistance element includes a resistor with one terminal selectively coupled to the first bias voltage terminal or to the second bias voltage terminal, and another terminal coupled to the output node of the first driver subcircuit. In an embodiment, each switchable resistance element comprises two resistors coupled together at the output node of the first driver subcircuit, wherein one resistor is selectively coupled to the first bias voltage terminal, and the other resistor is selectively coupled to the second bias voltage terminal. In an embodiment, the switchable resistance elements are selectively coupled to the bias voltage terminals with semiconductor switches.

Another exemplary embodiment provides a method of producing an output signal of a line driver. The method includes constructing the line driver with a first group of switchable resistance elements that are coupled between a first output terminal of the line driver and either a first bias voltage terminal or a second bias voltage terminal and a second group of switchable resistance elements that are coupled between the first output terminal and either the first bias voltage terminal or the second bias voltage terminal. The method includes driving the first output terminal with a first signal sense by coupling each resistance element of the first group to the first bias voltage terminal and coupling each resistance element of the second group to the second bias voltage terminal. The method further includes driving the first output terminal with a second signal sense by coupling each resistance element of both the first and second groups to the second bias voltage terminal.

In an embodiment, the method further includes constructing the line driver with a third group of switchable resistance elements that are coupled between a second output terminal and either the first bias voltage terminal or the second bias voltage terminal, and a fourth group of switchable resistance elements that are coupled between the second output terminal and either the first bias voltage terminal or the second bias voltage terminal. The method includes driving the second output terminal with the second signal sense by coupling each element in the third group to the first bias voltage terminal and coupling each element in the fourth group to the second bias voltage terminal. The method further includes driving the second output terminal with the first signal sense by coupling each element of both the third and fourth groups to the second bias voltage terminal.

In an embodiment, the method includes forming each switchable resistance element with a resistor with one resistor terminal selectively coupled to the first bias voltage terminal or to the second bias voltage terminal, and the other resistor terminal coupled to the first output terminal. In an embodiment, the method includes forming each switchable resistance element with two resistors, each of the resistors with a terminal that are coupled together at the first output terminal, another terminal of one resistor selectively coupled to the first bias voltage terminal, and another terminal of the other resistor selectively coupled to the second bias voltage terminal. In an embodiment, the method includes forming each switchable resistance element with substantially the same resistance. In an embodiment, the method includes choosing the collective number of the switchable resistance elements in the first and second groups to produce an impedance that substantially matches a characteristic impedance of a signal line coupled to the line driver.

In an embodiment, the method includes forming the first and second groups of switchable resistance elements to have collectively the same number of resistance elements as the third and fourth groups. In an embodiment, the first and second groups of switchable resistance elements and the third and fourth groups of switchable resistance elements produce a differentially balanced signal at the first and second output terminals. In an embodiment, the method includes forming the switchable resistance elements with replicated circuits. In an embodiment, the method includes forming each replicated circuit with a resistor coupled to a plurality of switches In an embodiment, the method includes coupling the resistors to the terminals of the bias voltage source with semiconductor switches. In an embodiment, the semiconductor switches are preferably field-effect transistors. In an embodiment, the method includes forming the subcircuits with replicated circuits. In a further embodiment, the method includes forming the replicated circuits with a resistor coupled to a plurality of switches.

Although a line driver circuit and related methods have been described for application to driving a transmission line, it should be understood that other applications of a line driver circuit are contemplated within the broad scope of the invention, and need not be limited to transmission line-driving arrangements.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A line driver comprising a first driver subcircuit, the first driver subcircuit comprising a first output node configured to drive a first terminal of a load, and a first plurality of switchable resistance elements, the first plurality of switchable resistance elements grouped into a first and a second group of switchable resistance elements, wherein, in a first partial drive strength configuration, each switchable resistance element in the first group has a resistor that is coupled to a first bias voltage terminal and each switchable resistance element in the second group has a resistor that is coupled to a second bias voltage terminal to drive the load with a first signal sense and a partial drive strength, the partial drive strength being less than 100% of a full output voltage drive strength, and wherein, in a second partial drive strength configuration, each element of the first and second groups has a resistor that is coupled to the second bias voltage terminal to drive the load with a second signal sense and the partial drive strength, the second signal sense opposite the first signal sense.

2. The line driver as claimed in claim 1, wherein, in a first full drive strength configuration, each switchable resistance element in the first and second groups has a resistor that is coupled to the first bias voltage terminal to drive the load with the first signal sense and a full drive strength, the full drive strength being 100% of the full output voltage drive strength, and wherein, in a second full drive strength configuration, each switchable resistance element of the first and second groups has a resistor that is coupled to the second bias voltage terminal to drive the load with the second signal sense and the full drive strength.

3. The line driver as claimed in claim 1, wherein each switchable resistance element comprises a resistor with one terminal selectively coupled to the first bias voltage terminal or to the second bias voltage terminal, and another terminal coupled to the first output node of the first driver subcircuit.

4. The line driver as claimed in claim 1, wherein each switchable resistance element comprises two resistors coupled together at the first output node of the first driver subcircuit, wherein one resistor is selectively coupled to the first bias voltage terminal, and wherein the other resistor is selectively coupled to the second bias voltage terminal.

5. The line driver as claimed in claim 1, wherein the switchable resistance elements are selectively coupled to the bias voltage terminals with semiconductor switches.

6. The line driver as claimed in claim 5, wherein the semiconductor switches comprise field-effect transistors.

7. The line driver as claimed in claim 1, wherein the line driver drives the first output node of the first driver subcircuit with a line-driver impedance substantially matched to a characteristic impedance of a transmission line coupled to the line driver.

8. The line driver as claimed in claim 1, further comprising a second driver subcircuit, the second driver subcircuit comprising a second output node configured to drive a second terminal of the load, and a second plurality of switchable resistance elements, the second plurality of switchable resistance elements grouped into a third group and a fourth group of switchable resistance elements, wherein, in the first partial drive strength configuration, each switchable resistance element in the third and fourth groups group has a resistor that is coupled to the second bias voltage terminal to further drive the load with the first signal sense and the partial drive strength, and wherein, in the second partial drive strength configuration, each switchable resistance element in the third group has a resistor that is coupled to the first bias voltage terminal and each element in the fourth group has a resistor that is coupled to the second bias voltage terminal to further drive the load with the second signal sense and the partial drive strength.

9. The line driver as claimed in claim 8,
wherein, in a first full drive strength configuration, each switchable resistance element in the first and second groups has a resistor that is coupled to the first bias voltage terminal, and each switchable resistance element in the third and fourth groups has a resistor that is coupled to the second bias voltage terminal to drive the load with the first signal sense and a full drive strength, the full drive strength being 100% of the full output voltage drive strength, and
wherein, in a second full drive strength configuration. each switchable resistance element of the first and second groups has a resistor that is coupled to the second bias voltage terminal to drive the load with the second signal sense and the full drive strength, and each switchable resistance element in the third and fourth groups has a resistor that is coupled to the first bias voltage terminal to drive the load with the second signal sense and the full drive strength.

10. The line driver as claimed in claim 8, wherein the line driver produces a differentially balanced signal between the first output node and the second output node.

11. The line driver as claimed in claim 8, wherein the first and second subcircuits are formed with replicated circuits.

12. The line driver as claimed in claim 11, wherein one of the replicated circuits comprises a resistor coupled to a plurality of switches.

13. A line driver comprising:
a first driver subcircuit comprising a first output configured to be coupled to a first terminal of a load, and a first plurality of switchable resistance elements, the first plurality of switchable resistance elements grouped into a first group and a second group of switchable resistance elements; and
a second driver subcircuit comprising a second output configured to be coupled to a second terminal of the load, and a second plurality of switchable resistance elements, wherein,
in a first full amplitude configuration, each switchable resistance element in the first and second groups is coupled to a first bias voltage terminal and not coupled to a second bias voltage terminal, and each switchable resistance element in the second plurality of switchable resistance elements is coupled to the second bias voltage terminal and not coupled to the first voltage terminal to drive the load with a first signal sense and a full signal amplitude, the full signal amplitude being 100% of a full output voltage drive strength, and
in a first reduced amplitude configuration, each switchable resistance element in the first group is coupled to the first bias voltage terminal and not coupled to the second voltage terminal, each switchable resistance element in the second group is coupled to the second bias voltage terminal and not coupled to the first voltage terminal, and each switchable resistance element in the second plurality of switchable resistance elements is coupled to the second bias voltage terminal and not coupled to the first voltage terminal to drive the load with the first signal sense and a reduced signal amplitude, the reduced signal amplitude being less than 100% of the full signal output voltage drive strength.

14. The line driver as claimed in claim 13, wherein each switchable resistance element comprises a resistor with one terminal selectively coupled to the first bias voltage terminal or to the second bias voltage terminal, and another terminal coupled to the output node of the first driver subcircuit.

15. The line driver as claimed in claim 13, wherein each switchable resistance element comprises two resistors each with a respective terminal coupled together at the output node of the first driver subcircuit, wherein another terminal of one resistor is selectively coupled to the first bias voltage terminal, and wherein another terminal of the other resistor is selectively coupled to the second bias voltage terminal.

16. The line driver as claimed in claim 13, wherein the switchable resistance elements are selectively coupled to the bias voltage terminals with semiconductor switches.

17. The line driver as claimed in claim 13, wherein:
the second plurality of switchable resistance elements is grouped into a third group and a fourth group of switchable resistance elements;
in a second full amplitude configuration, each switchable resistance element in the first and second groups is coupled to the second bias voltage terminal, and each switchable resistance element in the third and fourth groups is coupled to the first bias voltage terminal to drive the load with a second signal sense and the full signal amplitude, the second signal sense opposite the first signal sense; and
in a second reduced amplitude configuration, each switchable resistance element in the first and second groups is coupled to the second bias voltage terminal, each switchable resistance element in the third group is coupled to the first bias voltage terminal, and each switchable resistance element in the fourth group is coupled to the second bias voltage terminal to drive the load with the second signal sense and the reduced signal amplitude.

18. A method of producing an output signal of a line driver having a first output terminal configured to be coupled to a first terminal of a load, a first group of switchable resistance elements that are switchably coupled between a first output terminal of the line driver and either a first bias voltage terminal and not a second bias voltage terminal or the second bias voltage terminal and not the first bias voltage terminal and a second group of switchable resistance elements that are switchably coupled between the first output terminal and either the first bias voltage terminal and not the second bias voltage terminal or the second bias voltage terminal and not the first bias voltage terminal, the method comprising:
driving the load with a first signal sense and a partial drive strength, driving the load with the first signal sense and the partial drive strength comprising coupling each resistance element of the first group to the first bias voltage terminal and not the second bias voltage terminal and coupling each resistance element of the second group to the second bias voltage terminal and not the first voltage terminal, wherein the partial drive strength comprises a drive strength less than 100% of a full drive strength; and
driving the load with a second signal sense, driving the load with the second signal sense and the partial drive strength comprising coupling each resistance element of both the first and second groups to the second bias voltage terminal and not the first voltage terminal, wherein the second signal sense is opposite the first signal sense.

19. The method as claimed in claim 18, wherein each switchable resistance element comprises a resistor with one terminal selectively coupled to the first bias voltage terminal or to the second bias voltage terminal, and another terminal thereof coupled to the first output terminal.

20. The method as claimed in claim 18, further including forming each switchable resistance element with two resistors, each resistor with a terminal that are coupled together at the first output terminal, and selectively coupling another terminal of one resistor to the first bias voltage terminal, and another terminal of the other resistor to the second bias voltage terminal.

21. The method as claimed in claim 18, further including choosing a collective number of the switchable resistance elements in the first and second groups to produce an impedance that substantially matches a characteristic impedance of a signal line coupled to the line driver.

22. The method as claimed in claim 18, wherein each switchable resistance element has substantially the same resistance.

23. The method as claimed in claim 18, wherein the line driver further has a second output terminal configured to be coupled to a second terminal of the load, and a third group of switchable resistance elements that are coupled between a second output terminal of the line driver and either the first bias voltage terminal or the second bias voltage terminal, and a fourth group of switchable resistance elements that are coupled between the second output terminal and either the first bias voltage terminal or the second bias voltage terminal, and wherein:
   driving the load with the second signal sense and the partial drive strength further comprises coupling each element in the third group to the first bias voltage terminal and coupling each element in the fourth group to the second bias voltage terminal; and
   driving the load with the first signal sense and the partial drive strength further comprises coupling each element of both the third and fourth groups to the second bias voltage terminal.

24. The method as claimed in claim 23, further including choosing a collective number of switchable resistance elements in the first and second groups to have the same collective number of resistance elements in the third and fourth groups.

25. The method as claimed in claim 23, wherein the first and second groups of switchable resistance elements and the third and fourth groups of switchable resistance elements produce a differentially balanced signal at the first and second output terminals.

26. The method as claimed in claim 18, further including forming the switchable resistance elements with replicated circuits.

27. The method as claimed in claim 26, further including forming each replicated circuit with a resistor coupled to a plurality of switches.

28. A line driver comprising a first driver subcircuit, the first driver subcircuit comprising a first plurality of switchable resistance elements, the first plurality of switchable resistance elements grouped into a first and a second group of switchable resistance elements;
   wherein, in a first partial drive strength configuration, each switchable resistance element in the first group is coupled to a first bias voltage terminal and each element in the second group is coupled to a second bias voltage terminal to drive an output node of the first driver subcircuit with a first signal sense and a partial drive strength the partial drive strength being less than 100% of a full output voltage drive strength;
   wherein, in a second partial drive strength configuration, each switchable resistance element of the first and second groups is coupled to the second bias voltage terminal to drive the output node of the first driver subcircuit with a second signal sense and the partial drive strength, the second signal sense opposite the first signal sense;
   wherein, in a first full drive strength configuration, each switchable resistance element in the first and second groups is coupled to the first bias voltage terminal to drive the output node of the first driver subcircuit with the first signal sense and a full drive strength, the full drive strength being 100% of the full output voltage drive strength; and
   wherein, in a second full drive strength configuration, each switchable resistance element of the first and second groups is coupled to the second bias voltage terminal to drive the output node of the first driver subcircuit with the second signal sense and the full drive strength.

29. A line driver comprising a first driver subcircuit, the first driver subcircuit comprising a first plurality of switchable resistance elements, the first plurality of switchable resistance elements grouped into a first and a second group of switchable resistance elements; and
   second driver subcircuit, the second driver subcircuit comprising a second plurality of switchable resistance elements, the second plurality of switchable resistance elements grouped into a third group and a fourth group of switchable resistance elements
   wherein, in a first partial drive strength configuration, each switchable resistance element in the first group is coupled to a first bias voltage terminal and each element in the second group is coupled to a second bias voltage terminal to drive an output node of the first driver subcircuit with a first signal sense and a partial drive strength, the partial drive strength being less than 100% of a full output voltage drive strength;
   wherein, in a second partial drive strength configuration, each switchable resistance element of the first and second groups is coupled to the second bias voltage terminal to drive the output node of the first driver subcircuit with a second signal sense and the partial drive strength, the second signal sense opposite the first signal sense;
   wherein, in the first partial drive strength configuration, each element in the third and fourth groups is coupled to the second bias voltage terminal to drive the output node of the second driver subcircuit with the first signal sense and the partial drive strength; and
   wherein, in the second partial drive strength configuration, each element in the third group is coupled to the first bias voltage terminal and each element in the fourth group is coupled to the second bias voltage terminal to drive the output node of the second driver subcircuit with the second signal sense and the partial drive strength;
   wherein, in a first full drive strength configuration, each switchable resistance element in the third and fourth groups is coupled to the second bias voltage terminal to drive the output node of the second driver subcircuit with the first signal sense and a full drive strength, the full drive strength being 100% of the full output voltage drive strength; and
   wherein, in second full drive strength configuration, each switchable resistance element in the third and fourth groups is coupled to the first bias voltage terminal to drive the output node of the second driver subcircuit with the second signal sense and the full drive strength.

30. The line driver according to claim 1, wherein the load comprises a transmission line.

31. A method of driving a load having a first terminal and a second terminal, the method comprising:
   driving the load with a partial amplitude and a first signal sense, the partial amplitude less than 100% of a full amplitude, driving the load with the first amplitude and the first signal sense comprising
      coupling a first group of resistors between the first terminal and a first bias voltage terminal, coupling a second group of resistors between the first terminal and a second bias voltage terminal,
coupling a third group of resistors between the second terminal and the second bias voltage terminal, and
coupling a fourth group of resistors between the second terminal and the second bias voltage terminal; and
driving the load with the partial amplitude and a second signal sense, the second signal sense opposite the first signal sense, driving the load with the partial amplitude and a second signal sense comprising
coupling the first group of resistors between the first terminal and the second bias voltage terminal,
coupling the second group of resistors between the first terminal and a second bias voltage terminal,
coupling the third group of resistors between the first terminal and the second bias voltage terminal, and
coupling the fourth group of resistors between the second terminal and the second bias voltage terminal.

32. The method of claim 31, further comprising
driving the load with the full amplitude and the first signal sense, driving the load with the full amplitude and the first signal sense comprising
coupling the first group of resistors between the first terminal and the first bias voltage terminal,
coupling the second group of resistors between the first terminal and the first bias voltage terminal,
coupling the third group of resistors between the second terminal and the second bias voltage terminal, and
coupling the fourth group of resistors between the second terminal and the second bias voltage terminal; and
driving the load with the full amplitude and the second signal sense, driving the load with the full amplitude and the second signal sense comprising
coupling the first group of resistors between the first terminal and the second bias voltage terminal,
coupling the second group of resistors between the first terminal and the second bias voltage terminal,
coupling the third group of resistors between the second terminal and the first bias voltage terminal, and
coupling the fourth group of resistors between the second terminal and the first bias voltage terminal.

33. The method of claim 31, wherein:
coupling the first group of resistors between the first terminal and the first bias voltage terminal comprises switchably coupling a first resistor between the first terminal and the first bias voltage; and
coupling the first group of resistors between the first terminal and the second bias voltage terminal comprises switchably coupling the first resistor between the first terminal and the second bias voltage.

34. The method of claim 33, wherein coupling the first resistor between the first terminal and the second bias voltage further comprises decoupling the first resistor from the first bias terminal.

35. The method of claim 31, wherein:
coupling the first group of resistors between the first terminal and the first bias voltage terminal comprises coupling a first resistor between the first terminal and the first bias voltage and decoupling a second resistor from between the second bias terminal and the second bias voltage.

36. The method of claim 31, further comprising
allocating a first set of resistors to the first and second groups of resistors to form a first allocation;
allocating a second set of resistors to the third and fourth groups of resistors to form a second allocation; and
varying the partial amplitude by changing the first allocation and the second allocation.

37. The method of claim 31, wherein
a number of resistors in the first group and the third group is the same; and
a number of resistors in the second group and the fourth group is the same.

* * * * *